US012097523B2

(12) United States Patent
Zhong

(10) Patent No.: US 12,097,523 B2
(45) Date of Patent: Sep. 24, 2024

(54) MISTING FAN

(71) Applicant: Nanjing Chervon Industry Co., Ltd., Nanjing (CN)

(72) Inventor: Keqiong Zhong, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 460 days.

(21) Appl. No.: 17/532,300

(22) Filed: Nov. 22, 2021

(65) Prior Publication Data

US 2022/0080437 A1 Mar. 17, 2022

Related U.S. Application Data

(63) Continuation of application No. PCT/CN2021/082930, filed on Mar. 25, 2021.

(30) Foreign Application Priority Data

Apr. 26, 2020 (CN) .......................... 202010336441.4
Apr. 26, 2020 (CN) .......................... 202020655158.3
Apr. 26, 2020 (CN) .......................... 202020656944.5

(51) Int. Cl.
*B05B 9/03* (2006.01)
*B01F 23/23* (2022.01)
(Continued)

(52) U.S. Cl.
CPC ................ *B05B 9/03* (2013.01); *B01F 23/23* (2022.01); *B05B 1/3006* (2013.01); *F04D 25/08* (2013.01)

(58) Field of Classification Search
CPC .................................. B01F 23/23; B05B 9/03
See application file for complete search history.

(56) References Cited

U.S. PATENT DOCUMENTS

| 6,176,437 B1 | 1/2001 | Skannerup et al. |
| 6,272,874 B1 | 8/2001 | Keeney |

(Continued)

FOREIGN PATENT DOCUMENTS

| CN | 101811604 A | 8/2010 |
| CN | 102189049 A | 9/2011 |

(Continued)

OTHER PUBLICATIONS

Extended Search Report from European application No. 21795346.2, dated Jun. 9, 2023, 8 pp.

(Continued)

*Primary Examiner* — Robert A Hopkins
(74) *Attorney, Agent, or Firm* — Greenberg Traurig, LLP

(57) ABSTRACT

A misting fan includes a nozzle, a fan assembly, and a support assembly. The nozzle is configured to spray water. The support assembly is formed with a coupling portion for detachably coupling a battery pack. The nozzle is disposed on the fan assembly or the support assembly and includes a nozzle body and a second part. The nozzle body includes a first part formed with a first surface and the second part is detachably installed to the nozzle body and formed with a second surface. When the second part is installed to the nozzle body, a water flow channel is formed between the second surface and the first surface. When the second part is detached from the nozzle body, the first surface is at least partially exposed for cleaning access.

19 Claims, 17 Drawing Sheets

(51) Int. Cl.
  *B05B 1/30* (2006.01)
  *F04D 25/08* (2006.01)

(56) References Cited

U.S. PATENT DOCUMENTS

| | | |
|---|---|---|
| 2003/0111746 A1 | 6/2003 | Stutts |
| 2008/0006721 A1 | 1/2008 | Huang |
| 2009/0014556 A1 | 1/2009 | Gokal |
| 2013/0219933 A1 | 8/2013 | Hubert |
| 2015/0247644 A1 | 9/2015 | Stearns |
| 2020/0041149 A1 | 2/2020 | Oakes, III |

FOREIGN PATENT DOCUMENTS

| | | | |
|---|---|---|---|
| CN | 202460867 U | | 10/2012 |
| CN | 103611648 A | | 3/2014 |
| CN | 203565241 U | | 4/2014 |
| CN | 105275773 A | | 1/2016 |
| CN | 205744536 U | | 11/2016 |
| CN | 205747278 U | | 11/2016 |
| CN | 106925453 A | | 7/2017 |
| CN | 206668591 U | | 11/2017 |
| CN | 206785677 U | * | 12/2017 |
| CN | 208161866 U | | 11/2018 |
| CN | 110124894 A | | 8/2019 |
| CN | 209212590 U | | 8/2019 |
| CN | 212643116 U | | 3/2021 |
| CN | 212657007 U | | 3/2021 |
| KR | 101763067 B1 | * | 8/2017 |

OTHER PUBLICATIONS

Office Action from European application No. 2175346.2, dated Feb. 15, 2024, 6 pp.
ISA/CN, International search report issued on PCT application No. PCT/CN2021/082930, dated Jul. 2, 2021, 4 pages.
ISA/CN, English translation of International search report issued on PCT application No. PCT/CN2021/082930, dated Jul. 2, 2021, 2 pages.

* cited by examiner

MISTING FAN

RELATED APPLICATION INFORMATION

This application is a continuation of International Application Number PCT/CN2021/082930, filed on Mar. 25, 2021, through which this application also claims the benefit under 35 U.S.C. § 119(a) of Chinese Patent Application No. CN 202010336441.4, filed on Apr. 26, 2020, Chinese Patent Application No. CN 202020655158.3, filed on Apr. 26, 2020, and Chinese Patent Application No. CN 202020656944.5, filed on Apr. 26, 2020, which are incorporated herein by reference in their entirety.

TECHNICAL FIELD

The present disclosure relates to a fan and, in particular, to a misting fan.

BACKGROUND

The existing misting fan generally uses external mains electricity as a power source so that the misting fan can only be used where there is a socket, which reduces the convenience to use the misting fan and also limits the places where the misting fan can be used. Moreover, a nozzle on the existing misting fan is easily clogged and then needs to be replaced by a new nozzle, which increases the cost of use and also reduces operation efficiency. Especially when the misting fan is operating, if the nozzle is clogged and cannot be replaced in time, the misting fan cannot operate. Further, if the nozzle of the misting fan is not completely clogged, a user may not notice that the nozzle has a problem and will not replace the nozzle in time, thereby seriously affecting the cooling effect of the misting fan.

SUMMARY

In one example of the disclosure, a misting fan includes a nozzle, a fan assembly, and a support assembly. The nozzle is configured to spray water. The fan assembly includes fan blades and an electric motor configured to drive the fan blades to rotate. The support assembly is configured to support the fan assembly. The support assembly is formed with a coupling portion for detachably coupling a battery pack. The nozzle is disposed on the fan assembly or the support assembly and includes a nozzle body and a second part. The nozzle body includes a first part formed with a first surface. The second part is detachably installed to the nozzle body and formed with a second surface. In the case where the second part is installed to the nozzle body, a water flow channel is formed between the second surface and the first surface; and in the case where the second part is detached from the nozzle body, the first surface is at least partially exposed to be cleaned.

In one example of the disclosure, the nozzle is detachably installed to the support assembly.

In one example of the disclosure, the fan assembly further includes a fan cover surrounding the fan blades, where the nozzle is detachably installed to the fan cover.

In one example of the disclosure, the nozzle body further includes a support piece configured to support the first part, where the first part and the support piece are detachably connected.

In one example of the disclosure, in the case where the second part is detached from the nozzle body, the second surface is at least partially exposed to be cleaned.

In one example of the disclosure, a connection piece is configured to detachably connect the second part to the nozzle body; the second part is formed with a water outlet hole through which the water is sprayed to an outside; and the second part and the connection piece are detachably connected.

In one example of the disclosure, the second part is formed with a water outlet hole through which the water is sprayed to an outside, where a diameter of the water outlet hole is greater than or equal to 0.2 mm and less than or equal to 0.4 mm.

In one example of the disclosure, the second part is formed with a water outlet hole through which the water is sprayed to an outside, where the water outlet hole has a centerline; where the first surface surrounds the centerline, and the second surface surrounds the centerline.

In one example of the disclosure, the nozzle body further includes a support piece configured to support the first part and formed with a water inlet hole and an accommodation cavity in which the first part is disposed.

In one example of the disclosure, the first part is movably disposed in the accommodation cavity.

In one example of the disclosure, the nozzle body further includes an elastic piece disposed in the accommodation cavity and a spring supported between the elastic piece and the first part; where the accommodation cavity is formed with a hole communicating with the water inlet hole on a bottom surface of the accommodation cavity, and the elastic piece is supported at the hole.

In one example of the disclosure, the nozzle has a water outlet hole centered on a centerline, where a section line of the first surface in a plane passing through the centerline obliquely intersects with the centerline, and a section line of the second surface in the plane also obliquely intersects with the centerline.

In one example of the disclosure, the first surface is a part of one conical surface and the second surface is a part of another conical surface.

In one example of the disclosure, the nozzle body further includes a support piece configured to support the first part, where the support piece is formed with a threaded portion configured to detachably install the nozzle to the fan assembly or the support assembly, and a sealing ring is disposed on the support piece.

In one example of the disclosure, the misting fan further includes the battery pack detachably installed to the coupling portion, a waterway system including a water pipe connected to the nozzle, and a pump connected to the water pipe; where output water pressure of the pump is greater than or equal to 40 psi and less than or equal to 120 psi.

In one example of the disclosure, a misting fan includes a nozzle, a fan assembly, and a support assembly. The nozzle is configured to spray water. The fan assembly includes fan blades and an electric motor configured to drive the fan blades to rotate. The support assembly is configured to support the fan assembly. The support assembly is formed with a coupling portion for detachably coupling a battery pack. The nozzle is disposed on the fan assembly or the support assembly and includes a nozzle body and a second part. The nozzle body includes a first part formed with a first surface. The second part is movably installed to the nozzle body and formed with a second surface. In the case where the second part moves to a first position relative to the first part, a water flow channel is formed between the second surface and the first surface; and in the case where the second part moves to a second position relative to the first part, the first surface is at least partially exposed to be cleaned.

In one example of the disclosure, a misting fan includes a nozzle, a fan assembly, and a support assembly. The nozzle is configured to spray water. The fan assembly includes fan blades and an electric motor configured to drive the fan blades to rotate. The support assembly is configured to support the fan assembly. The support assembly is formed with a coupling portion for detachably coupling a battery pack. The nozzle is disposed on the fan assembly or the support assembly and includes a first part and a second part. The first part is formed with a first surface. The second part is movable relative to the first part and formed with a second surface. In the case where the second part moves to a first position relative to the first part, a water flow channel is formed between the second surface and the first surface; and in the case where the second part moves to a second position relative to the first part, the first surface or the second surface is at least partially exposed to be cleaned.

In one example of the disclosure, the second part is formed with a water outlet hole through which the water is sprayed to an outside, where a diameter of the water outlet hole is greater than or equal to 0.2 mm and less than or equal to 0.4 mm.

In one example of the disclosure, the second part is formed with the water outlet hole through which the water is sprayed to the outside, and the water outlet hole has a centerline; where the first surface surrounds the centerline and the second surface surrounds the centerline.

In one example of the disclosure, the first surface is a part of one conical surface and the second surface is a part of another conical surface.

In one example of the disclosure, a misting fan includes a nozzle configured to spray water, a fan assembly including fan blades and a electric motor configured to drive the fan blades to rotate, and a support assembly configured to support the fan assembly. The support assembly is formed with a coupling portion surrounding and forming a battery compartment in which a first battery pack and a second battery pack are capable of being installed, and the first battery pack has a first volume and the second battery pack has a second volume. The support assembly is further connected to a battery cover. The battery cover has an open state in which the first battery pack or the second battery pack is allowed to be detached from the battery compartment and a closed state in which the battery compartment is closed relative to the coupling portion. When the battery cover is in the closed state, the battery cover and the coupling portion jointly surround and form an accommodation cavity for accommodating the first battery pack or the second battery pack. An access terminal electrically connected to the first battery pack or the second battery pack is disposed in the battery compartment.

In one example of the disclosure, the battery cover is rotatably connected to the coupling portion around a first axis. When the misting fan is disposed on a plane, the first axis is parallel to the plane.

In one example of the disclosure, the coupling portion is further formed with a guide structure guiding the first battery pack or the second battery pack to be coupled to the battery compartment along a direction of a first straight line. When the misting fan is disposed on the plane, the direction of the first straight line intersects with the plane so as to form an angle greater than 0 degrees and less than or equal to 30 degrees.

In one example of the disclosure, a water leakage hole is disposed on a bottom surface of the battery compartment.

In one example of the disclosure, the misting fan further includes a waterway system including a water pipe connected to the nozzle and a pump connected to the water pipe. Output water pressure of the pump is greater than or equal to 40 psi and less than or equal to 120 psi.

In one example of the disclosure, the misting fan further includes a waterway system including a water pipe connected to the nozzle and a pump connected to the water pipe. An output rotation speed of the pump is greater than or equal to 500 rpm.

In one example of the disclosure, the misting fan further includes a first adjustment piece configured to adjust a volume of the water sprayed from the nozzle.

In one example of the disclosure, the first adjustment piece includes a first thin film disposed on an outer surface of the support assembly and an actuation element disposed at least partially in the support assembly.

In one example of the disclosure, the first battery pack has a first capacity and the second battery pack has a second capacity, and a ratio of the first capacity to the second capacity is greater than 2.

In one example of the disclosure, the first battery pack has a capacity greater than 4.5 AH, the first battery pack includes a first cell group and a second cell group, and the first cell group and the second cell group are connected in parallel.

In one example of the disclosure, the first battery pack includes a first cell group and a second cell group, and the first cell group and the second cell group are connected in parallel.

In one example of the disclosure, a misting fan includes a nozzle configured to spray water, a fan assembly including fan blades and a electric motor configured to drive the fan blades to rotate, and a support assembly configured to support the fan assembly. The support assembly is formed with a coupling portion, the coupling portion surrounds and forms a battery compartment in which a first battery pack is capable of being installed, and the first battery pack has a nominal voltage greater than or equal to 20V. The support assembly is further connected to a battery cover. The battery cover has an open state in which the first battery pack is allowed to be detached from the battery compartment and a closed state in which the battery compartment is closed relative to the coupling portion. When the battery cover is in the closed state, the battery cover and the coupling portion jointly surround and form an accommodation cavity for accommodating the first battery pack. An access terminal electrically connected to the first battery pack is disposed in the battery compartment.

In one example of the disclosure, a misting fan includes a nozzle configured to spray water, a fan assembly including fan blades and a electric motor configured to drive the fan blades to rotate, a base configured to support the misting fan on a workbench, and a support arm connected to the base and configured to support the fan assembly. The base surrounds and forms an accommodation space. The misting fan further includes a first water pipe assembly, a second water pipe assembly, and a pump installed to the first water pipe assembly. The first water pipe assembly includes a first water pipe and a first connection piece configured to be connected to a first external water source, and the first water pipe includes a first end for installing the first connection piece. The second water pipe assembly includes a second water pipe and a second connection piece configured to be connected to a second external water source, and the second water pipe includes a second end for installing the second connection piece. The pump is disposed at least partially in the accommodation space and the second water pipe assembly is disposed outside the base.

In one example of the disclosure, the first external water source is a static water source and the second external water source is a flowing water source.

In one example of the disclosure, the fan assembly includes a fan cover surrounding the fan blades, and the second water pipe extends from an inside of the fan cover to an outside of the fan cover.

In one example of the disclosure, a part of the second water pipe outside the fan cover is exposed.

In one example of the disclosure, a limiting piece is disposed on an outer surface of the base, and the limiting piece is in contact with the second water pipe.

In one example of the disclosure, at least two nozzles are disposed. The misting fan further includes a distribution element configured to distribute water delivered from the first water pipe assembly or the second water pipe assembly to the nozzles. The distribution element is installed to the fan assembly.

In one example of the disclosure, the fan assembly further includes a front cover and a rear cover. The rear cover is docked with the front cover so as to form a first accommodation cavity and a second accommodation cavity, and the fan blades are disposed in the first accommodation cavity and the distribution element is disposed in the second accommodation cavity.

In one example of the disclosure, output water pressure of the pump is greater than or equal to 45 psi and less than or equal to 75 psi.

In one example of the disclosure, an output rotation speed of the pump is greater than or equal to 500 rpm and less than or equal to 900 rpm.

In one example of the disclosure, the base is formed with a coupling portion for coupling a battery pack.

DETAILED DESCRIPTION

Figure 1:
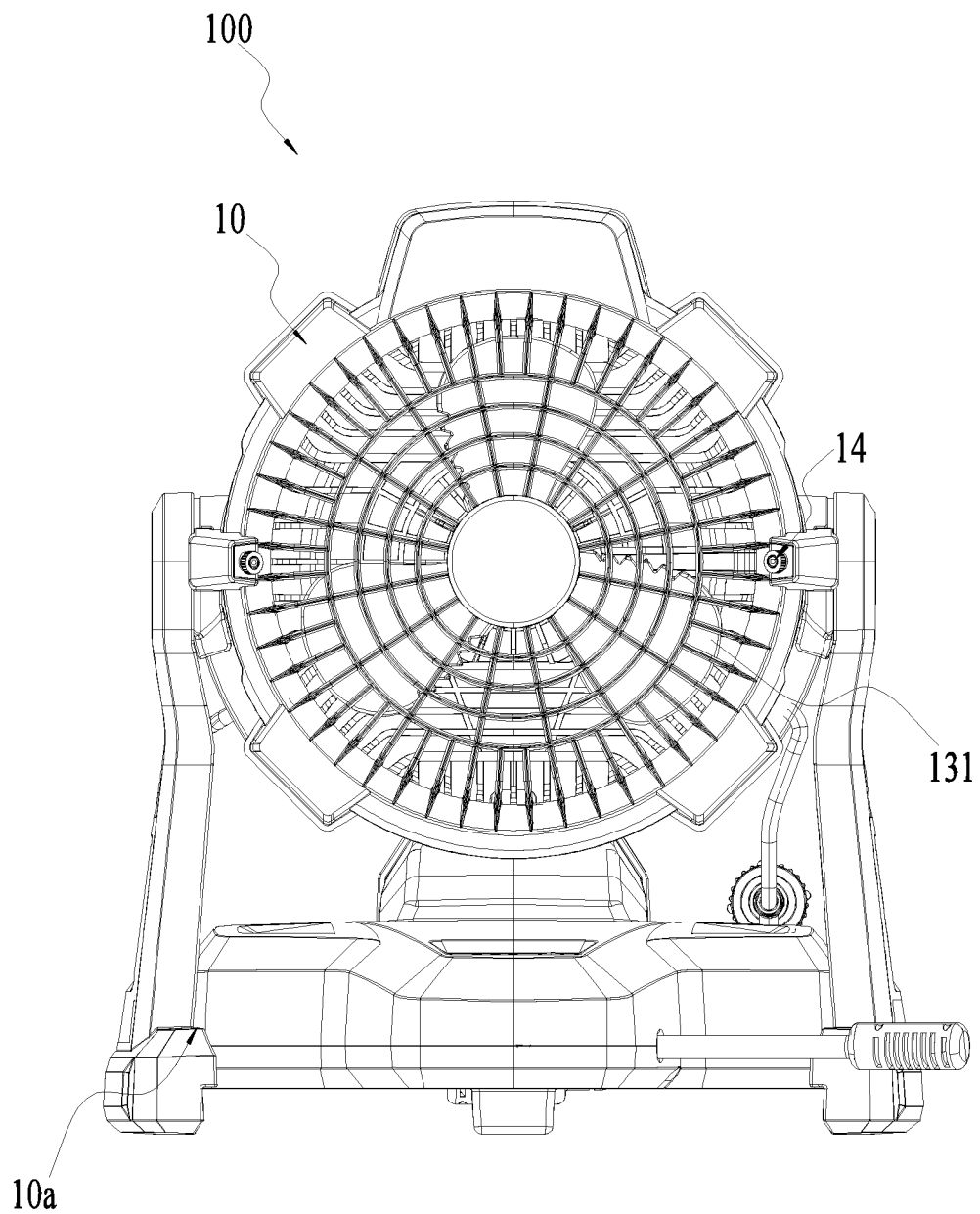
FIG. 1 is a plan view of a misting fan according to example one.

An example misting fan 100 shown in FIG. 1 is configured to spray water. The water sprayed into air can cool the environment. The misting fan 100 may be applied to outdoor places such as a basketball court, a park, and a playground. When used outdoors, the misting fan 100 may use water in a bucket. The misting fan 100 may also be applied to indoor places such as a shopping mall, a factory, and a warehouse. When used indoors, the misting fan 100 may be connected to a tap water pipe.

As shown in FIGS. 1 to 4, the misting fan 100 includes a main machine 10 and a first battery pack 101, where the first battery pack 101 may be detachably installed to the main machine 10. In this manner, the misting fan 100 can be conveniently carried outdoors for operation. The misting fan 100 with the first battery pack 101 is more convenient to use especially in places where there is no convenient power source such as the park.

The main machine 10 includes a support assembly 10a, a fan assembly 13, and a nozzle 14. The support assembly 10a is configured to support the fan assembly 13 and the nozzle 14, and the support assembly 10a includes a base 11 and a support arm 12. The base 11 is configured to support the entire misting fan 100 so that the misting fan 100 is placed on a workbench. The support arm 12 is connected to the base 11 and disposed at least partially above the base 11. An end of the support arm 12 is connected to the base 11, and the other end of the support arm 12 is connected to the fan assembly 13 so that the support arm 12 supports the fan assembly 13. The fan assembly 13 includes fan blades 131 and an electric motor 132, where the electric motor 132 is configured to drive the fan blades 131 to rotate around a electric motor axis 100a. The nozzle 14 is configured to spray the water and installed to the support assembly 10a or the fan assembly 13. When the first battery pack 101 is installed to the main machine 10, the misting fan 100 is started, the water is sprayed from the nozzle 14 into an external environment, and the fan blades 131 rotate to generate an airflow to blow the water sprayed from the nozzle 14 into the air so that the temperature of the air in the environment drops.

The first battery pack 101 is detachably installed to the support assembly 10a. In this example, the first battery pack 101 is installed to the base 11. It is to be understood that, in other examples, the first battery pack 101 may also be installed to the support arm 12. It is to be understood that all parts other than the fan blades 131 and the electric motor 132 driving the fan blades 131 to rotate in the misting fan 100 may be considered to belong to the support assembly 10a. In this manner, the first battery pack 101 may be installed to any part of the support assembly 10a.

Figure 4:
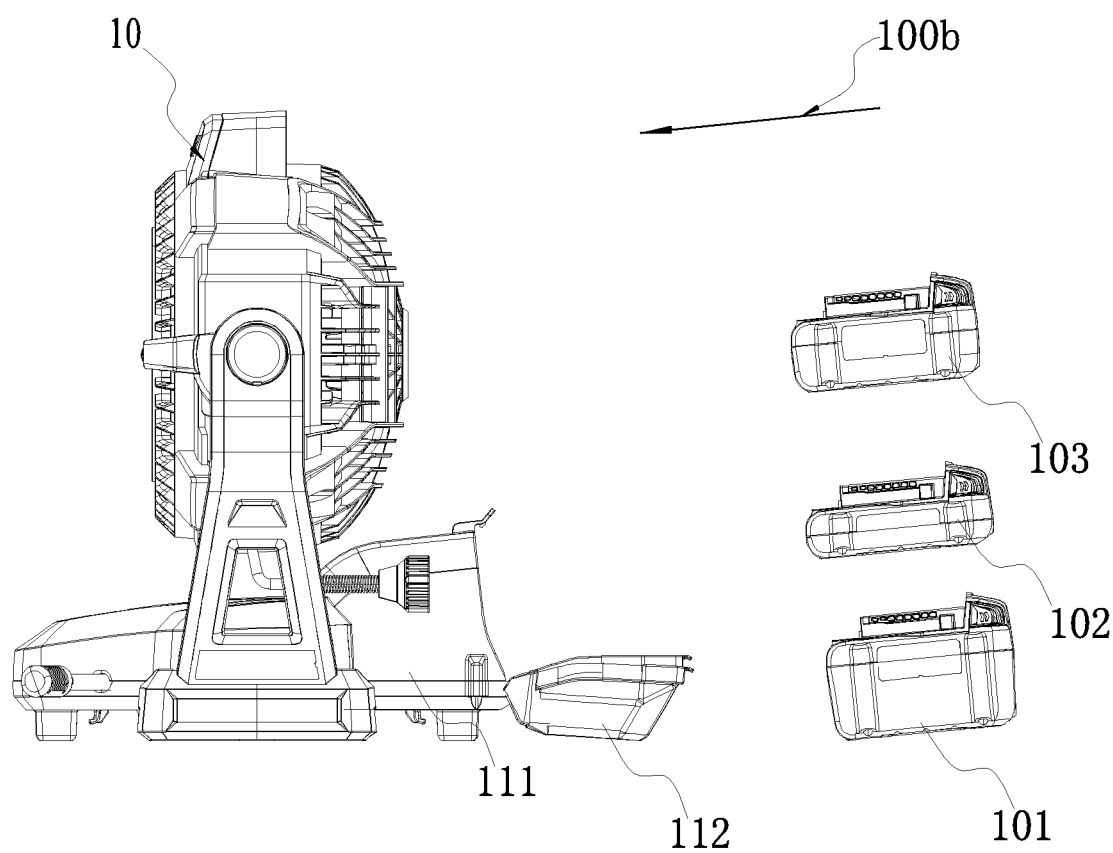
FIG. 4 is a perspective view of the misting fan of FIG. 1 with a first battery pack detached.
Figure 5:
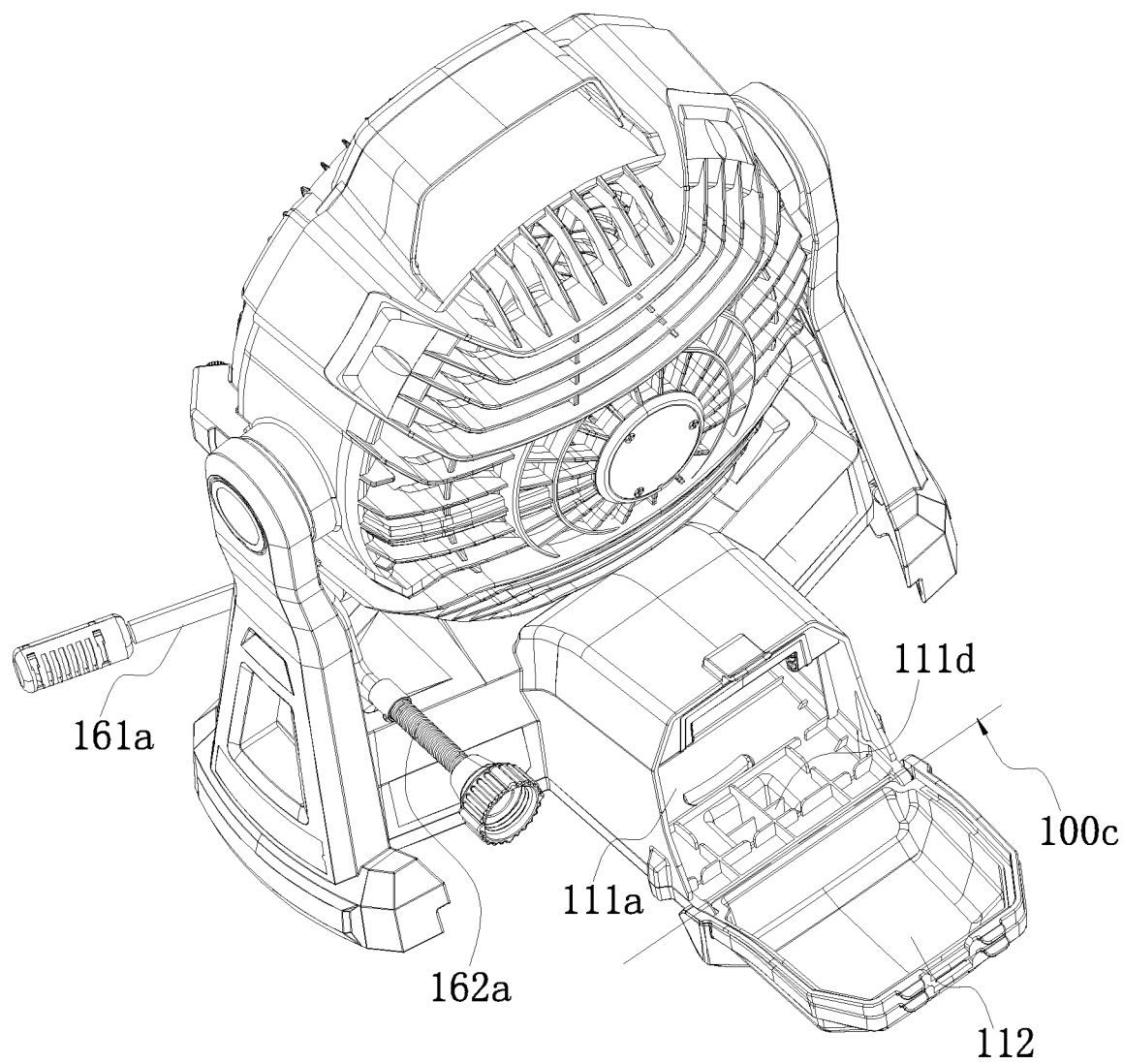
FIG. 5 is a perspective view of a main machine of the misting fan of FIG. 1.
Figure 6:
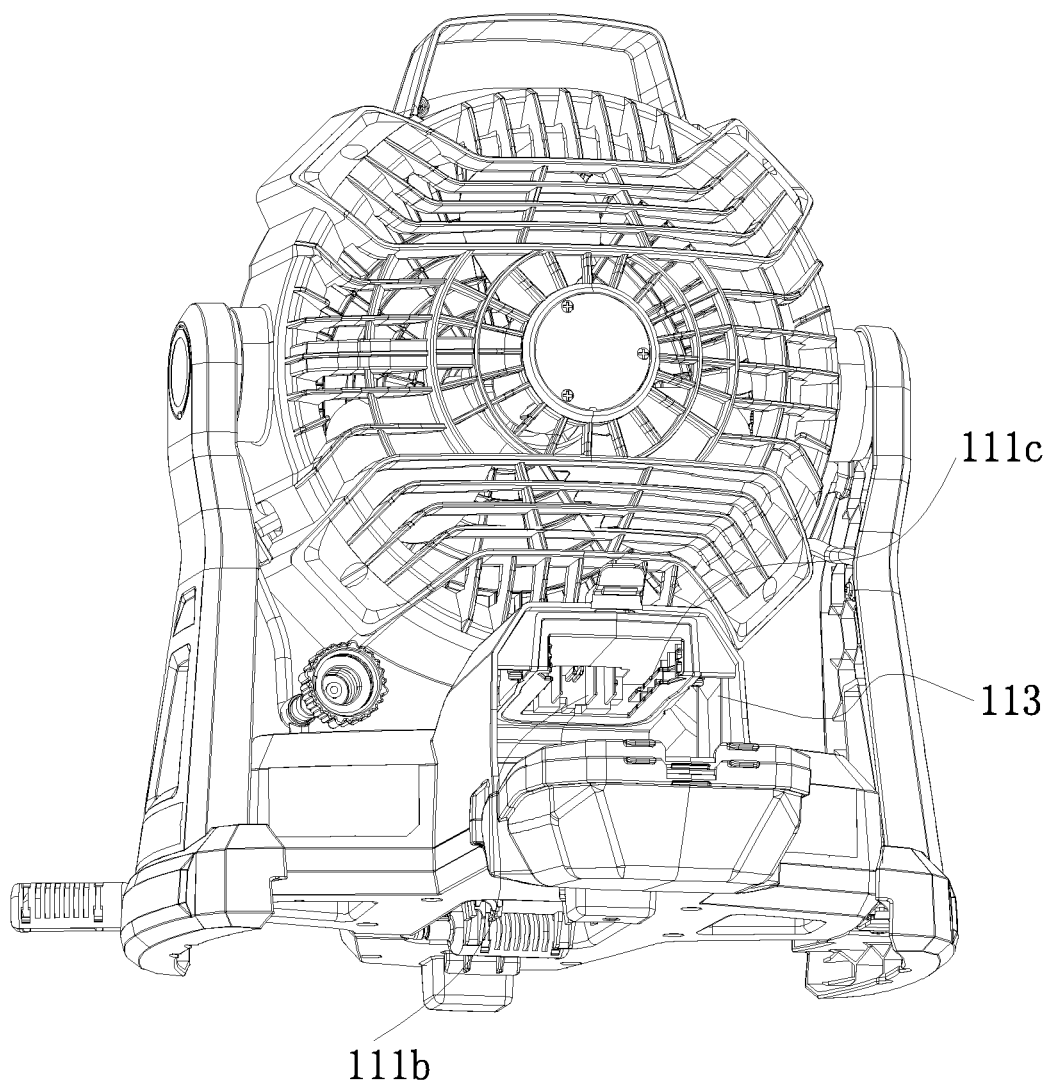
FIG. 6 is a perspective view of the main machine of FIG. 5 from another angle.

As shown in FIGS. 4 to 6, the base 11 is formed with a coupling portion 111 for coupling the first battery pack 101. The coupling portion 111 surrounds and forms a battery compartment 111a, where the first battery pack 101 is capable of being installed in the battery compartment 111a. In this example, a second battery pack 102 is also capable of being installed in the battery compartment 111a. The first battery pack 101 has a first volume and a first capacity, and the second battery pack 102 has a second volume and a second capacity. The first volume is greater than the second volume, and the first capacity is greater than the second capacity. The support assembly 10a further includes a battery cover 112, and the first battery pack 101 is connected to the coupling portion 111. The battery cover 112 has an open state and a closed state relative to the coupling portion 111. When the battery cover 112 is in the open state, the battery cover 112 allows the first battery pack 101 or the second battery pack 102 to be detached from the battery compartment 111a. When the battery cover 112 is in the closed state, the battery cover 112 and the coupling portion 111 jointly surround and form an accommodation cavity 113 for accommodating the first battery pack 101 or the second battery pack 102, and at this time, the battery cover 112 covers the battery compartment 111a. An access terminal 111b is disposed in the battery compartment 111a and electrically connected to the first battery pack 101 or the second battery pack 102. When the battery cover 112 is in the open state, the first battery pack 101 is capable of being inserted into the battery compartment 111a, and the second battery pack 102 is also capable of being inserted into the battery compartment 111a. A user can selectively insert the first battery pack 101 or the second battery pack 102 into the battery compartment 111a according to requirements. The battery compartment 111a can fit with not only the first battery pack 101 but also the second battery pack 102. Therefore, the user can install battery packs with different volumes or different capacities according to requirements, which improves the adaptability of the misting fan 100 and prolongs the lifetime of the misting fan 100. When the battery cover 112 is in the closed state, the battery cover 112 and the coupling portion 111 surround and form the accommodation cavity 113, and the accommodation cavity 113 can accommodate not only the first battery pack 101 but also the second battery pack 102. In this manner, the user can select and install a battery pack with a larger volume or a larger capacity to the misting fan 100.

In this example, the first battery pack 101 and the second battery pack 102 have the same nominal voltage, a nominal voltage of the first battery pack 101 is greater than or equal to 20V, and a nominal voltage of the second battery pack 102 is greater than or equal to 20V. Further, the nominal voltage of the first battery pack 101 is greater than or equal to 40V, and the nominal voltage of the second battery pack 102 is greater than or equal to 40V so that the first battery pack 101 or the second battery pack 102 outputs greater power and has a greater capacity, thereby improving the operation time and efficiency of the misting fan 100.

Of course, it is to be understood that the battery compartment 111a of the main machine 10 may also be adapted to a third battery pack 103, and the third battery pack 103 may have a third volume and a third capacity, thereby further improving the adaptability of the misting fan 100.

The support arm 12 supports the fan assembly 13 on an upper side of the base 11, and the fan assembly 13 can rotate relative to the support arm 12. The coupling portion 111 is disposed on a lower side of the fan assembly 13. When installed in the battery compartment 111a, the first battery pack 101 is located on the lower side of the fan assembly 13. In this manner, the coupling portion 111 does not interfere with the rotation of the fan assembly 13 and does not affect an air inlet region on a rear side of the fan assembly 13, thereby improving blowing efficiency. In this example, both the first battery pack 101 and the second battery pack 102 can be installed in the battery compartment 111a. Due to a relatively large volume of the first battery pack 101, a relatively large volume is provided in the battery compartment 111a. Therefore, in this example, the first battery pack 101 is inserted into the battery compartment 111a along a direction of a first straight line 100b, that is, the coupling portion 111 is formed with a guide structure 111c guiding the first battery pack 101 or the second battery pack 102 to be coupled to the battery compartment 111a along the direction of the first straight line 100b. When the misting fan 100 is placed on a plane, the first straight line 100b obliquely intersects with the plane. In this manner, on one hand, in the case where a position of the fan assembly 13 in an up-and-down direction perpendicular to the plane is not too high, the coupling portion 111 can be prevented from shielding the air inlet region of the fan assembly 13 as much as possible. On the other hand, the volume in the battery compartment 111a can be increased so that the battery pack with the larger volume or the larger capacity can be installed to the misting fan 100.

In this example, when the misting fan 100 is placed on the plane, the first straight line 100b intersects with the plane so as to form an angle greater than 0 degrees and less than or equal to 30 degrees. A height of the battery compartment 111a in the up-and-down direction is greater than or equal to 60 mm and less than or equal to 100 mm. In this manner, the volume in the battery compartment 111a is large enough so that the battery compartment 111a can be adapted to the battery pack with the larger volume.

Figure 7:
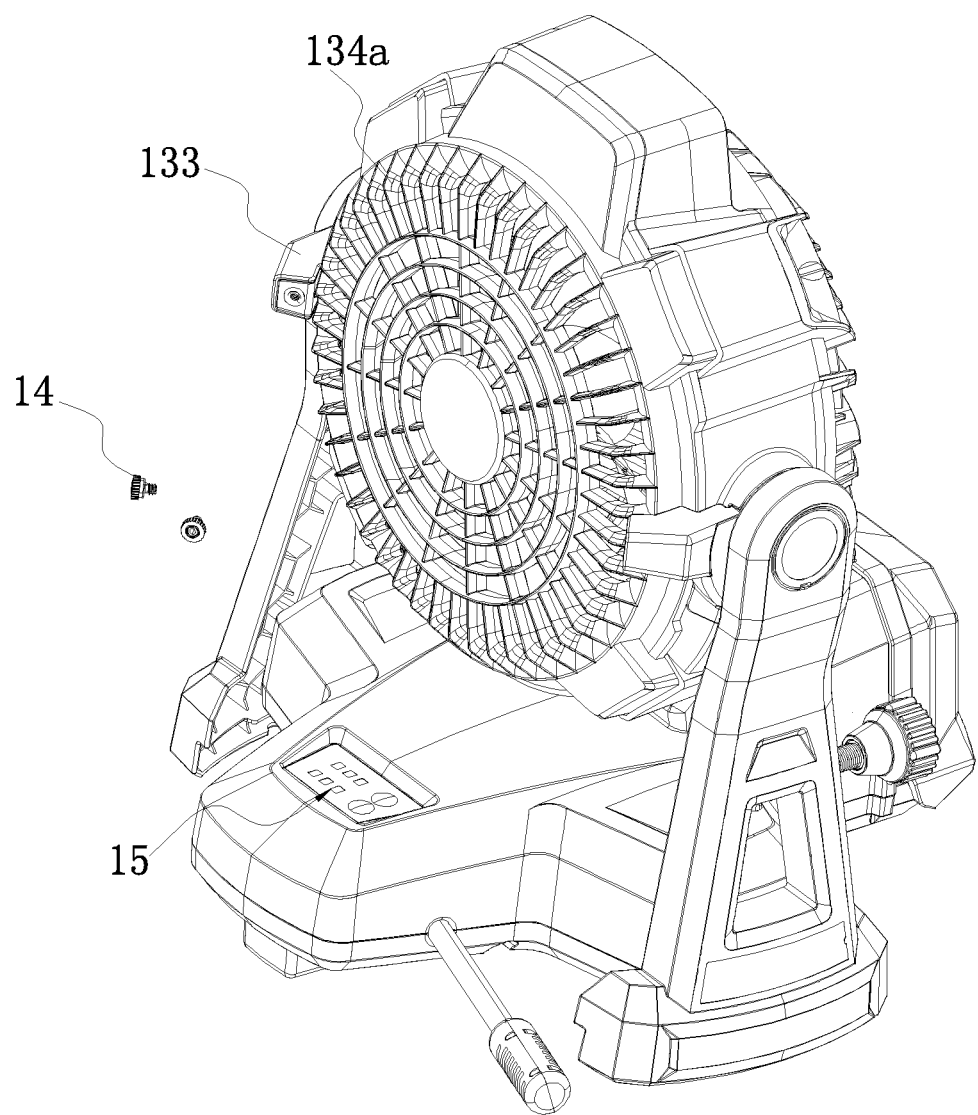
FIG. 7 is a perspective view of the misting fan of FIG. 1 with nozzles detached.

In a front-and-rear direction, the battery compartment 111a is disposed at least partially on the rear side of the fan assembly 13 so that an operation assembly 15 shown in FIG. 7 can be disposed in a region of the base 11 on a front side of the fan assembly 13. When the battery cover 112 is in the open state, the battery compartment 111a is open backwards, and the first battery pack 101 or the second battery pack 102 is inserted into the battery compartment 111a from a rear side of the main machine 10.

The battery cover 112 is rotatably connected to the coupling portion 111 around a first axis 100c. When the misting fan 100 is disposed on a plane, the first axis 100c is parallel to the plane. When the misting fan 100 is disposed on the plane, the user can open the battery cover 112 backwards so that the battery cover 112 is in the open state, and at this time, an outer surface of the battery cover 112 can be supported on the plane and the user does not need to hold the battery cover 112 with one hand and can conveniently detach the first battery pack 101 or the second battery pack 102, which improves the convenience of operation. The battery cover 112 is disposed on a rear side of the coupling portion 111, and the guide structure 111c guides the first battery pack 101 to be inserted into the battery compartment 111a in a direction oblique relative to the plane so that a region on the rear side of the coupling portion 111 is enough for the battery cover 112 to be opened. In this manner, when the misting fan 100 is placed on the plane, an angle through which the battery cover 112 rotates from a closed position to an open position is greater than 90 degrees. Therefore, when the battery cover 112 rotates to the open position, more space is reserved on an upper side of the battery cover 112 to allow the first battery pack 101 or the second battery pack 102 to be detached from the battery compartment 111a. Further, the problem that when the misting fan 100 is placed on the plane, the battery cover 112 cannot be opened backwards to the open position to allow the first battery pack 101 to be detached from the battery compartment 111a can be avoided, that is, the problem that the battery cover 112 cannot be completely opened can be avoided.

A water leakage hole 111d is disposed on a bottom surface of the battery compartment 111a. When entering the battery compartment 111a, water can flow out of the battery compartment 111a through the water leakage hole 111d.

Figure 2:
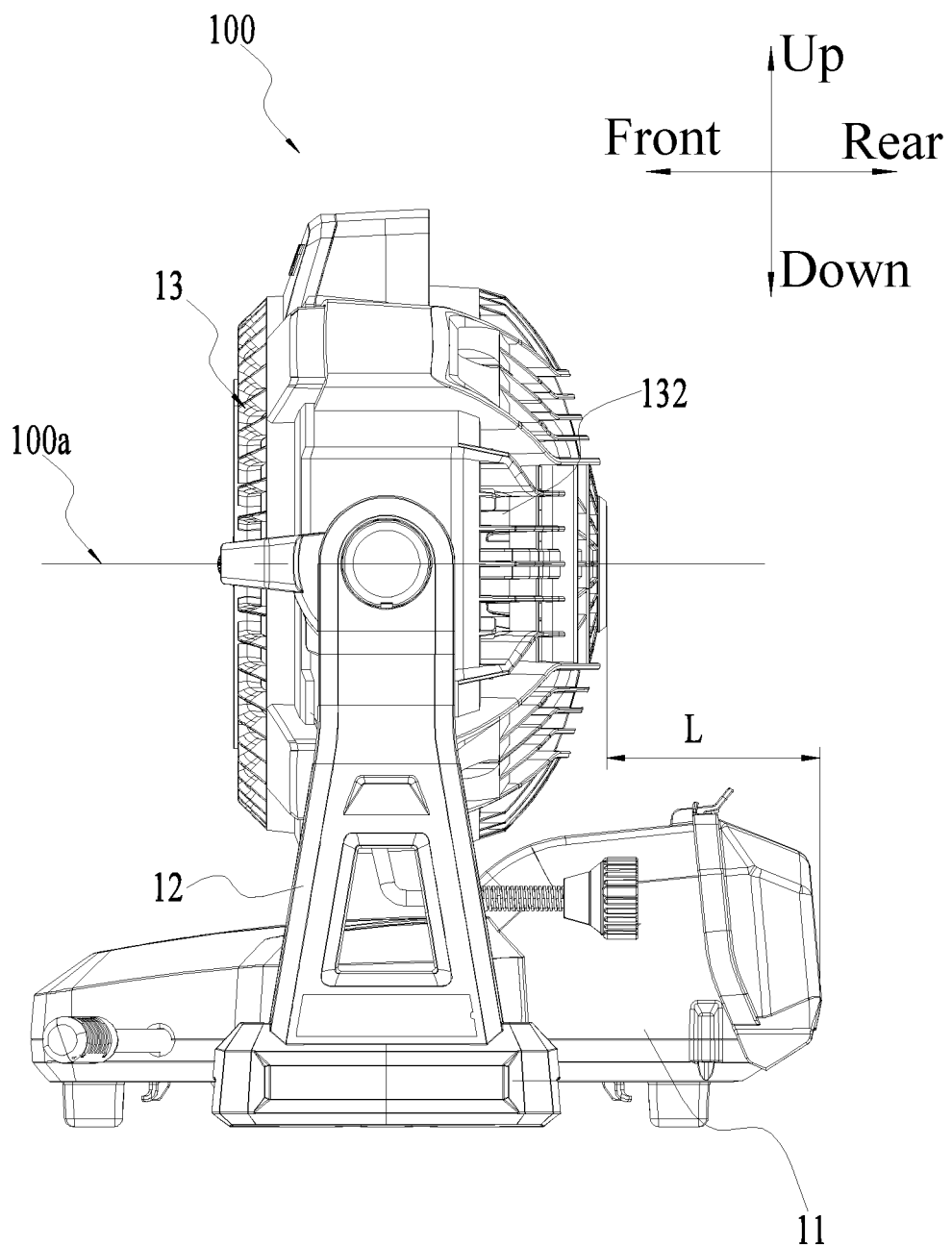
FIG. 2 is a side view of the misting fan of FIG. 1.
Figure 3:
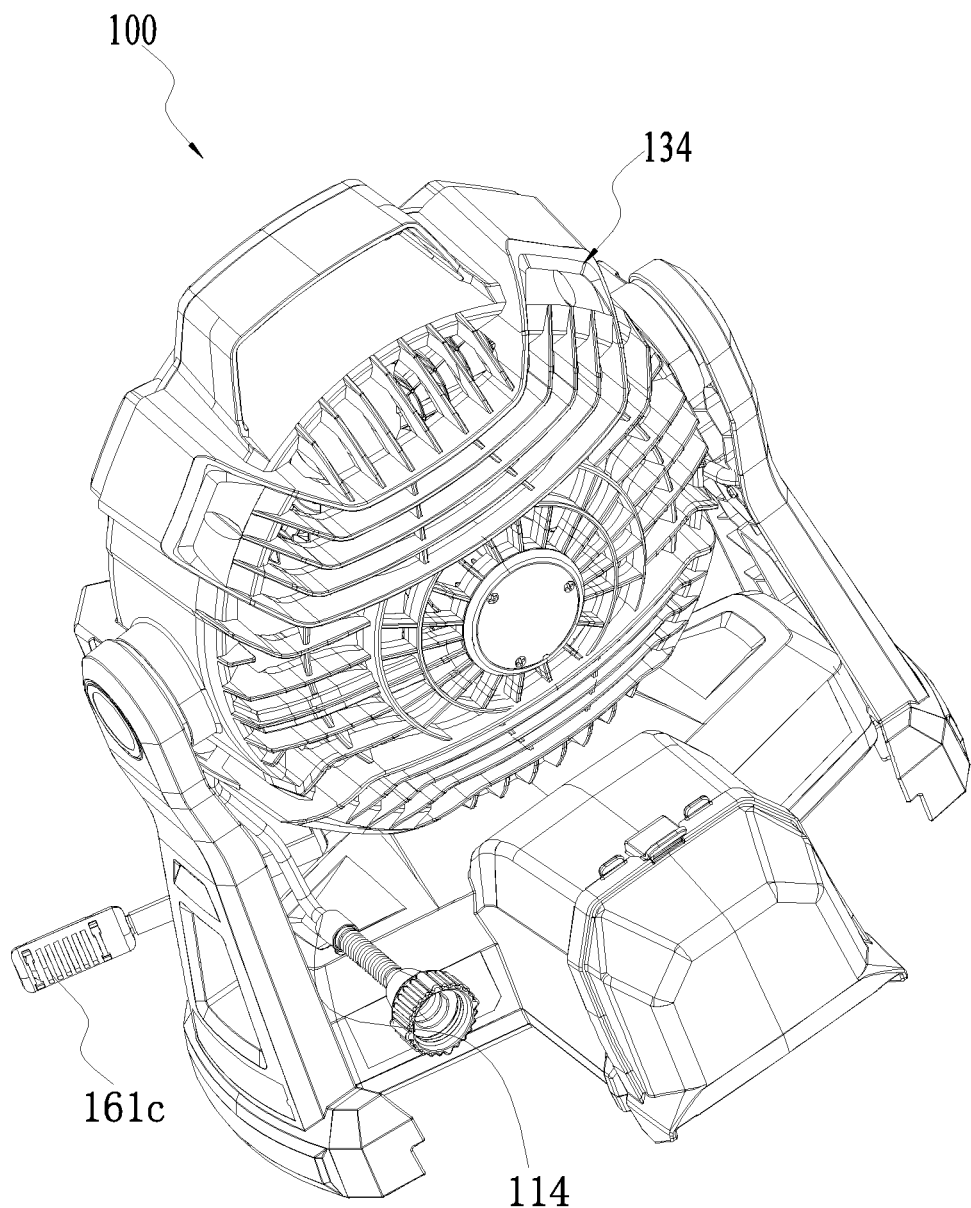
FIG. 3 is a perspective view of the misting fan of FIG. 1.

When the fan assembly 13 is in an upright state as shown in FIG. 2 and the battery cover 112 is in the closed state, a part of the whole formed by the coupling portion 111 and the battery cover 112 that is disposed on the rear side of the fan assembly 13 has a dimension L in the front-and-rear direction, where the dimension L is greater than or equal to 60 mm and less than or equal to 100 mm so that the volume in the battery compartment 111a can be increased.

In this example, a ratio of the first capacity of the first battery pack 101 to the second capacity of the second battery pack 102 is greater than or equal to 2. Alternatively, in other examples, the ratio of the first capacity of the first battery pack 101 to the second capacity of the second battery pack 102 is greater than or equal to 3.

The first capacity of the first battery pack 101 is also greater than 4.5 AH, thereby increasing the lifetime of the first battery pack 101 and increasing the operation duration of the misting fan 100. More specifically, the first battery pack 101 may include a first cell group and a second cell group, where multiple cell units in the first cell group are connected in series. Multiple cell units may also be disposed in the second cell group. The first cell group and the second cell group are connected in parallel. That is, two cell groups connected in parallel are disposed in the first battery pack 101. Of course, it is to be understood that in other examples, three cell groups connected in parallel may be disposed in the first battery pack 101, thereby further increasing the lifetime of the first battery pack 101. The first capacity of the first battery pack 101 may also be greater than or equal to 5 AH.

Figure 8:
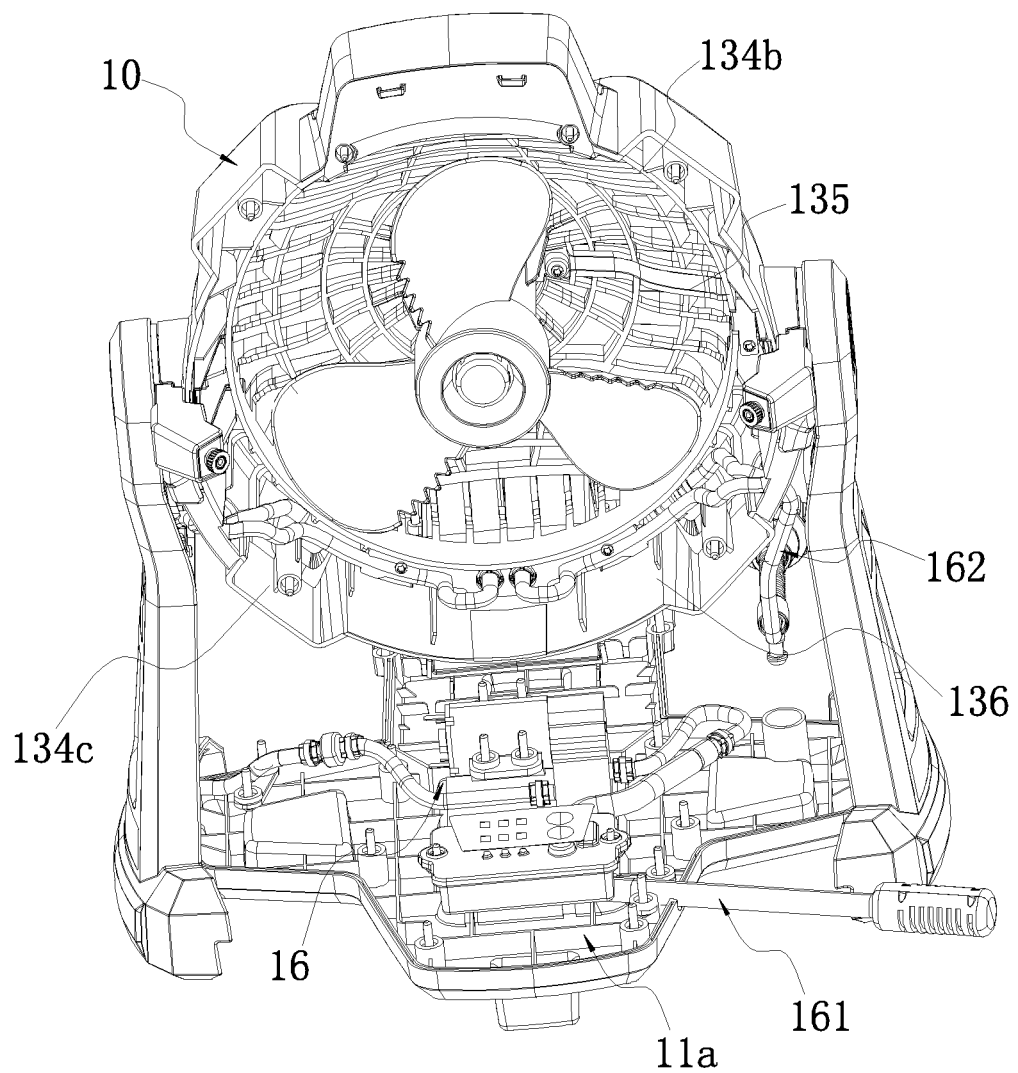
FIG. 8 is a perspective view of the misting fan of FIG. 1 with a base opened.

As shown in FIGS. 7 and 8, two nozzles 14 are provided, and two installation pieces 133 are connected on an outer side of the fan assembly 13. The two installation pieces 133 are respectively disposed on two sides of the fan assembly 13. The nozzle 14 is installed to the installation piece 133, and the whole formed by the nozzle 14 and the installation piece 133 can rotate with the fan assembly 13. The nozzle 14 is detachably installed to the installation piece 133. In this manner, when a water flow channel or a water outlet hole in the nozzle 14 is clogged by scale or debris, the user can conveniently detach the nozzle 14 to replace the nozzle 14 with a new one.

Figure 9:
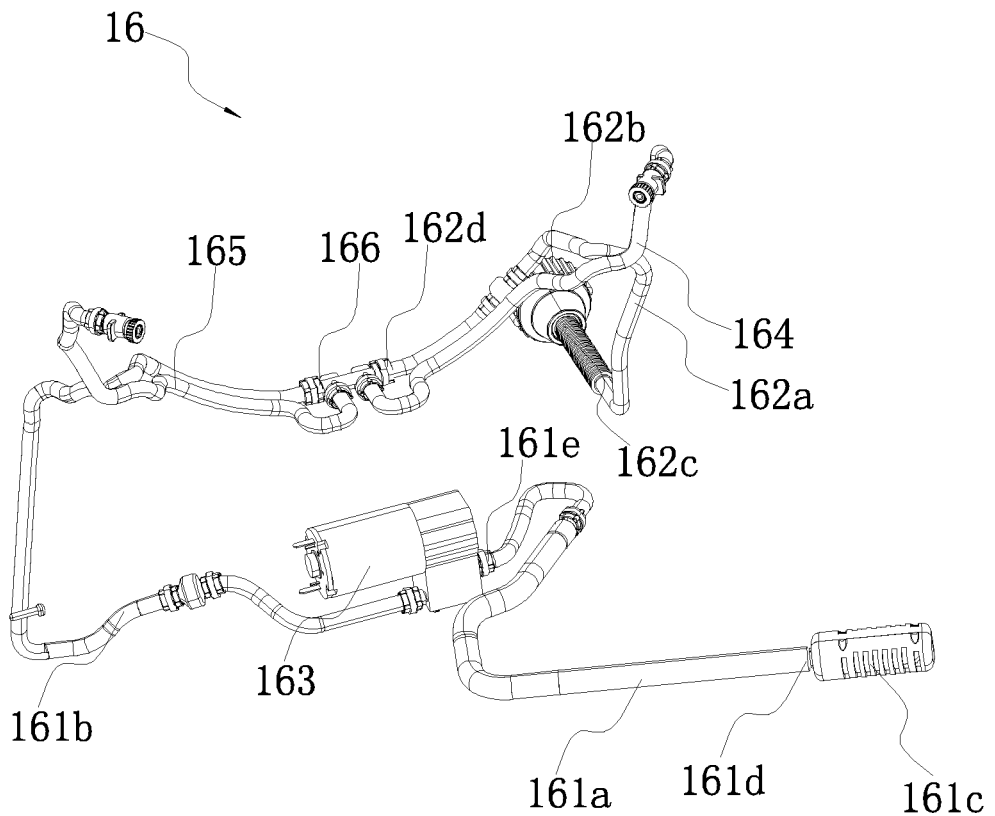
FIG. 9 is a perspective view of a waterway system of FIG. 8.

As shown in FIGS. 8 and 9, the main machine 10 further includes a waterway system 16 configured to deliver external water to the nozzle 14. The waterway system 16 includes a first water pipe assembly 161 and a second water pipe assembly 162. The first water pipe assembly 161 is configured to deliver external water from a first external water source to the nozzle 14. The first external water source may specifically be a static water source. The static water source may be understood as water contained in a storage such as the bucket. The second water pipe assembly 162 is configured to deliver external water from a second external water source to the nozzle 14. The second external water source is specifically a flowing water source. The flowing water source may be understood as a water source with a certain flowrate such as tap water. When used in a place with the flowing water source, the misting fan 100 may use the flowing water source so that the misting fan 100 can operate for a relatively long time without replacing the water source. When used in a place where there is no flowing water source, the misting fan 100 may use the water in the storage, thereby improving the convenience to use the misting fan 100.

Specifically, the first water pipe assembly 161 includes a first water pipe 161a, a third water pipe 161b, and a first connection piece 161c. The misting fan 100 further includes a pump 163 installed to the first water pipe assembly 161. The first water pipe 161a includes a first end 161d and a third end 161e. The first connection piece 161c is installed to the first end 161d of the first water pipe 161a, and the first connection piece 161c is configured to be connected to the first external water source. The third end 161e of the first water pipe 161a is connected to an input end of the pump 163, and the third water pipe 161b is connected to an output end of the pump 163. The pump 163 pumps the water in the storage into the first water pipe 161a and then outputs the water to the third water pipe 161b.

The base 11 surrounds and forms an accommodation space 11a, and the pump 163 is disposed in the accommodation space 11a. The battery compartment 111a is also formed by the base 11. In this example, the accommodation space 11a and the battery compartment 111a are disposed separately so that water vapor can be prevented from entering the battery compartment 111a.

The second water pipe assembly 162 includes a second water pipe 162a and a second connection piece 162b, and the second connection piece 162b is configured to be connected to the second external water source. The second water pipe 162a includes a second end 162c and a fourth end 162d, and the second connection piece 162b is installed to the second end 162c of the second water pipe 162a.

In this example, a part of the first water pipe assembly 161 is disposed in the base 11 and a part of the first water pipe assembly 161 is disposed in the fan assembly 13. The second water pipe assembly 162 is disposed outside the base 11. In this manner, the second water pipe assembly 162 does not pass through an inside of the base 11 so that a length of the second water pipe assembly 162 can be shortened, and the second water pipe assembly 162 can easily adapt to the rotation of the fan assembly 13. In this example, a part of the second water pipe assembly 162 is disposed in the fan assembly 13, another part of the second water pipe assembly 162 is disposed outside the fan assembly 13, and the part of the second water pipe assembly 162 outside the fan assembly 13 is exposed so that it is convenient for the user to connect the second water pipe assembly 162 to the flowing water source.

The fan assembly 13 further includes a fan cover 134 configured to surround the fan blades 131, and the electric motor 132 is also disposed in the fan cover 134. The installation piece 133 may be considered as a part of the fan cover 134 and may also be integrally formed with the fan cover 134. The nozzle 14 is disposed on the installation piece 133, which may also be understood as that the nozzle 14 is installed to the fan cover 134. The fan cover 134 further includes a front cover 134a and a rear cover 134b. When the front cover 134a is docked with the rear cover 134b, the front cover 134a and the rear cover 134b surround and form a first accommodation cavity 135 for accommodating a fan and the electric motor 132. A part of the second water pipe 162a extends into the fan cover 134, that is, a part of the second water pipe 162a is disposed in the first accommodation cavity 135, and the second water pipe 162a extends from an inside of the fan cover 134 to an outside of the fan cover 134. A part of the second water pipe 162a outside the fan cover 134 passes through neither the support arm 12 nor the base 11 so that the part of the second water pipe 162a outside the fan cover 134 is exposed. The part of the second water pipe 162a outside the fan cover 134 is exposed, which does not limit a protective sleeve to be sleeved on an outer wall of the second water pipe 162a. Even if the protective sleeve is sleeved on the second water pipe 162a, it is considered that the second water pipe 162a is exposed.

A limiting piece 114 is disposed on an outer surface of the base 11 and configured to be in contact with the second water pipe 162a to limit a position of the second water pipe 162a.

A first groove extending in a circumferential direction around the electric motor axis 100a is formed at an edge of the front cover 134a, and a second groove 134c extending in the circumferential direction around the electric motor axis 100a is formed at an edge of the rear cover 134b. When the front cover 134a is docked with the rear cover 134b, the first groove is docked with the second groove 134c to form a second accommodation cavity 136 for accommodating part of the waterway system 16.

The waterway system 16 further includes a fourth water pipe 164, a fifth water pipe 165, and a distribution element 166. The distribution element 166 is separately connected to the first water pipe assembly 161 and the second water pipe assembly 162 and configured to distribute water delivered from the first water pipe assembly 161 or the second water pipe assembly 162 to the fourth water pipe 164 and the fifth water pipe 165 and then deliver water to the nozzles 14 through the fourth water pipe 164 and the fifth water pipe 165. The distribution element 166 is installed to the fan assembly 13. Specifically, the distribution element 166 is disposed in the fan cover 134 and disposed in the second accommodation cavity 136, the second water pipe 162a extends into the second accommodation cavity 136 and is connected to the distribution element 166, and the third water pipe 161b also extends into the second accommodation cavity 136 and is connected to the distribution element 166 so that both the second water pipe 162a and the third water pipe 161b can deliver water to the distribution element 166. The distribution element 166 is also connected to the fourth water pipe 164 and the fifth water pipe 165. The fourth water pipe 164 is disposed partially in the second accommodation cavity 136, and the fifth water pipe 165 is disposed partially in the second accommodation cavity 136. An end of the fourth water pipe 164 is connected to the distribution element 166, and the other end of the fourth water pipe 164 is connected to one nozzle 14. An end of the fifth water pipe 165 is connected to the distribution element 166, and the other end of the fifth water pipe 165 is connected to another nozzle 14. In this manner, the waterway system 16 can be set more reasonably and has higher efficiency.

In this example, the pump 163 may be a diaphragm pump 163 or a piston pump 163. Output water pressure of the pump 163 is greater than or equal to 40 psi and less than or equal to 120 psi. An output rotation speed of the pump 163 is greater than or equal to 500 rpm and less than or equal to 900 rpm. In this manner, while it is ensured that a flowrate of the water sprayed from the nozzle 14 is sufficiently large, the flowrate of the water can be made more stable. Further, the output water pressure of the pump 163 is greater than or equal to 45 psi and less than or equal to 75 psi, and the output rotation speed of the pump 163 is greater than or equal to 500 rpm, which ensures that the operation duration of the first battery pack 101 or the second battery pack 102 can satisfy requirements of the user.

Figure 10:
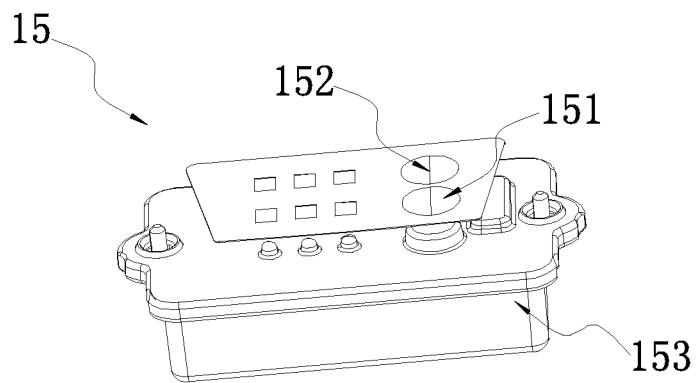
FIG. 10 is a perspective view of an operation assembly of FIG. 8.
Figure 11:
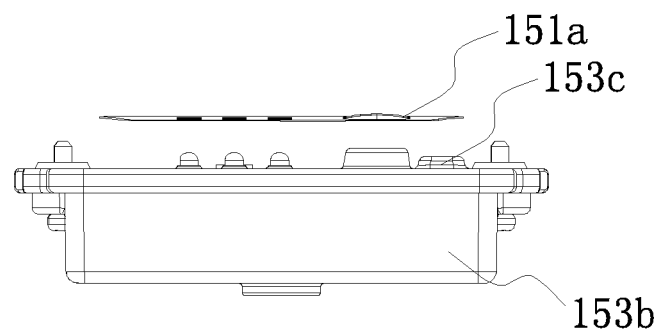
FIG. 11 is a plan view of the operation assembly of FIG. 10.
Figure 12:
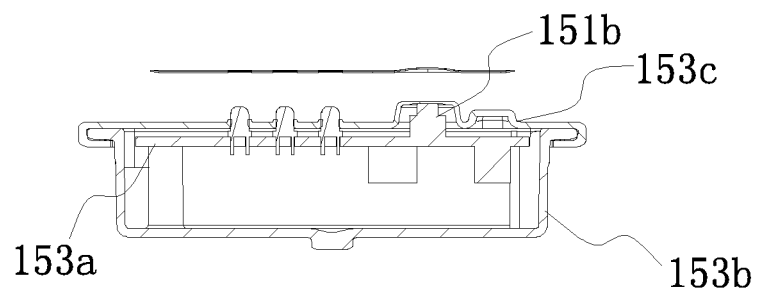
FIG. 12 is a sectional view of the operation assembly of FIG. 10.

As shown in FIGS. 10 to 12, the operation assembly 15 includes a first adjustment piece 151 and a second adjustment piece 152. The first adjustment piece 151 is configured to adjust a volume of the water sprayed from the nozzle 14 so that the user can select the volume of the water according to humidity in the environment. The second adjustment piece 152 is configured for the user to adjust a rotation speed of the fan so that the user can select a wind speed according to the humidity in the environment. The misting fan 100 further includes a circuit board assembly 153 configured to control the pump 163 and the electric motor 132.

The first adjustment piece 151 includes a first thin film 151a and a first actuation element 151b. The second adjustment piece 152 includes a second actuation element. The first thin film 151a is disposed on an outer surface of the support assembly 10a, the first actuation element 151b is disposed at least partially in the support assembly 10a, and the second actuation element is disposed in the support assembly 10a. The first thin film 151a is disposed on an upper surface of the base 11. The circuit board assembly 153 includes a circuit board 153a, a circuit board box 153b, and a sealing piece 153c. Both the first actuation element 151b and the second actuation element are installed on the circuit board 153a, the circuit board 153a is disposed in the accommodation space 11a surrounded by the base 11, the first actuation element 151b is disposed at least partially in the accommodation space 11a, and the second actuation element is disposed at least partially in the accommodation space 11a. The circuit board 153a is installed in the circuit board box 153b. When the circuit board 153a is disposed in the circuit board box 153b, sealant may be poured into the circuit board box 153b, which can improve the waterproof performance of the circuit board assembly 153. However, both the first actuation element 151b and the second actuation element are movably installed on the circuit board 153a, so the sealant cannot completely cover the first actuation element 151b and the second actuation element. In this example, the sealing piece 153c is disposed on an upper side of the whole formed by the circuit board 153a, the circuit board box 153b, the first actuation element 151b, and the second actuation element, and the sealing piece 153c may be a rubber piece. In this manner, the waterproof performance of the circuit board assembly 153 and the operation assembly 15 can be further improved.

Figure 13:
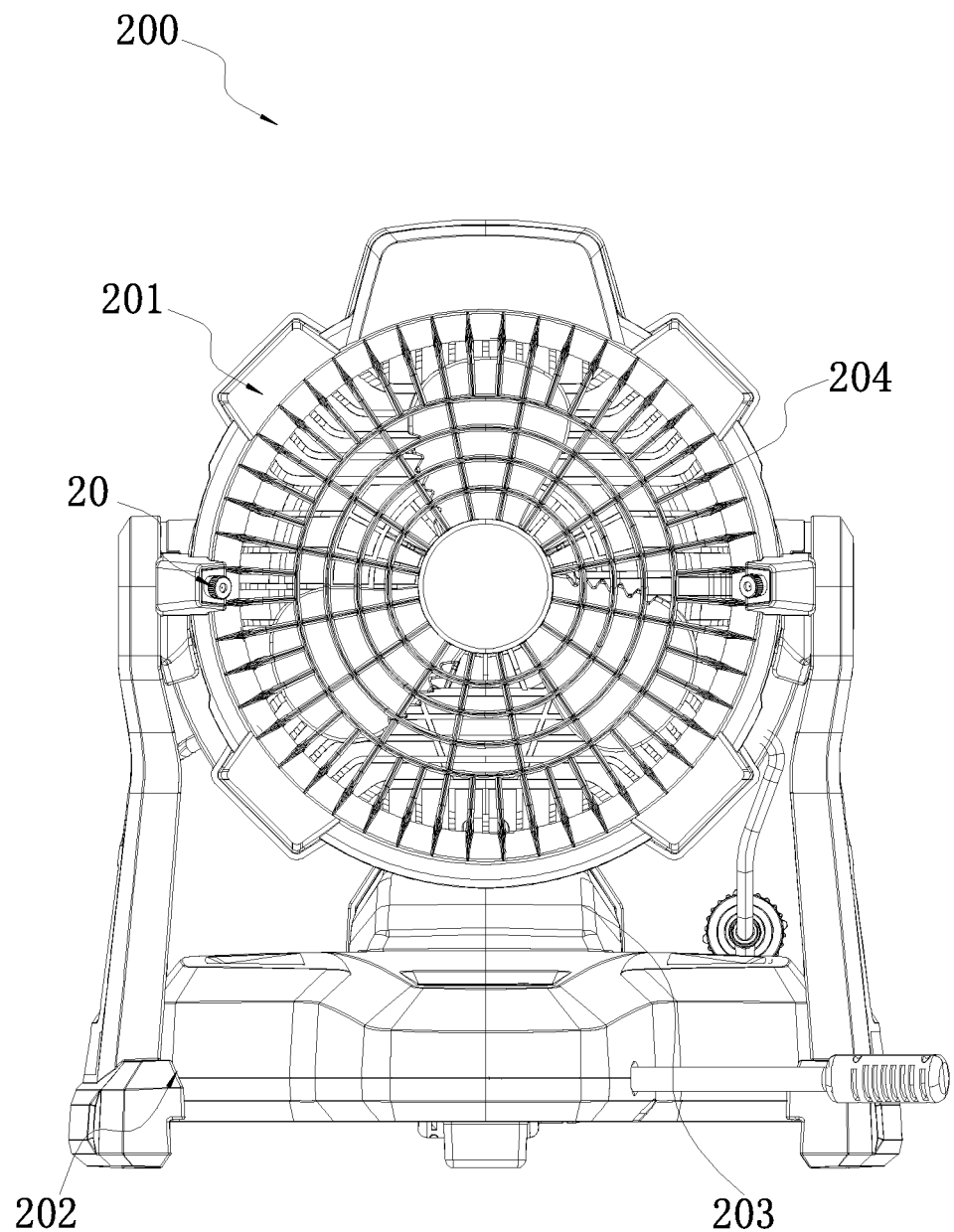
FIG. 13 is a plan view of a misting fan according to example two.

A further misting fan 200 is shown in FIG. 13. Compared with the misting fan 100 shown in FIG. 1, the misting fan 200 in this example has the same fan assembly 201, support assembly 202, and battery pack 203. A difference is that the misting fan 200 in this example has another nozzle 20 with a structure different from the structure of the nozzle 14 in the misting fan 100 in FIG. 1. In this example, the structures other than the nozzle 20 of the misting fan 200 are the same as those in example one. Hereinafter, only the structure of the nozzle 20 in this example is specifically described.

In this example, the nozzle 20 may be disposed on the fan assembly 201 or the support assembly 202. More specifically, the nozzle 20 is detachably installed on a fan cover 204.

Figure 14:
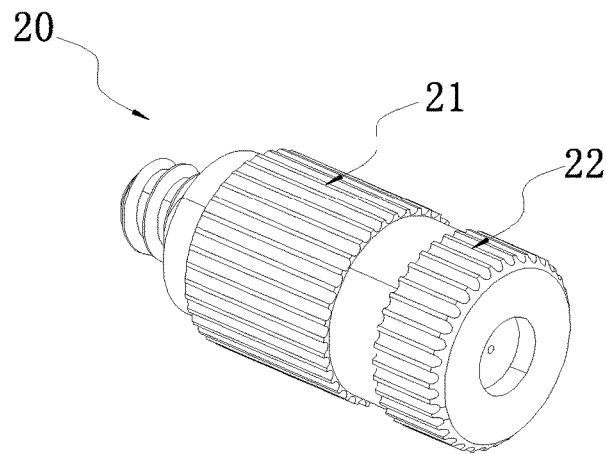
FIG. 14 is a perspective view of a nozzle of the misting fan of FIG. 13.
Figure 15:
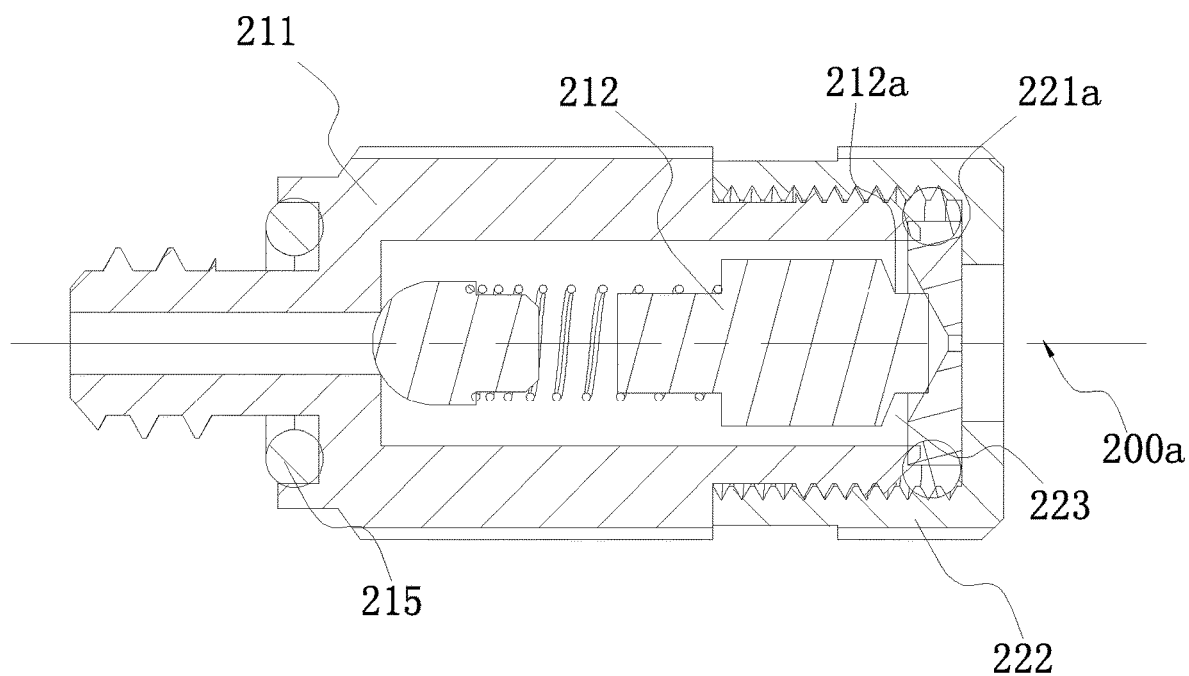
FIG. 15 is a sectional view of the nozzle of FIG. 14.
Figure 16:
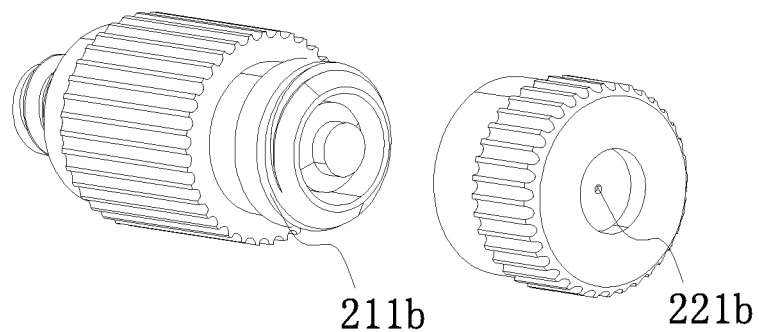
FIG. 16 is a perspective view of the nozzle of FIG. 14 with a nozzle head separated from a nozzle body.
Figure 17:
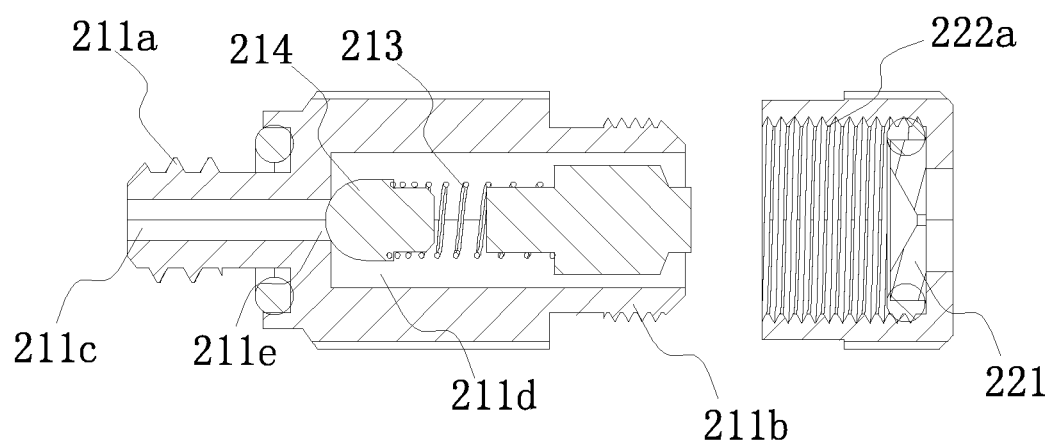
FIG. 17 is a sectional view of the nozzle of FIG. 14 with a nozzle head separated from a nozzle body.
Figure 18:
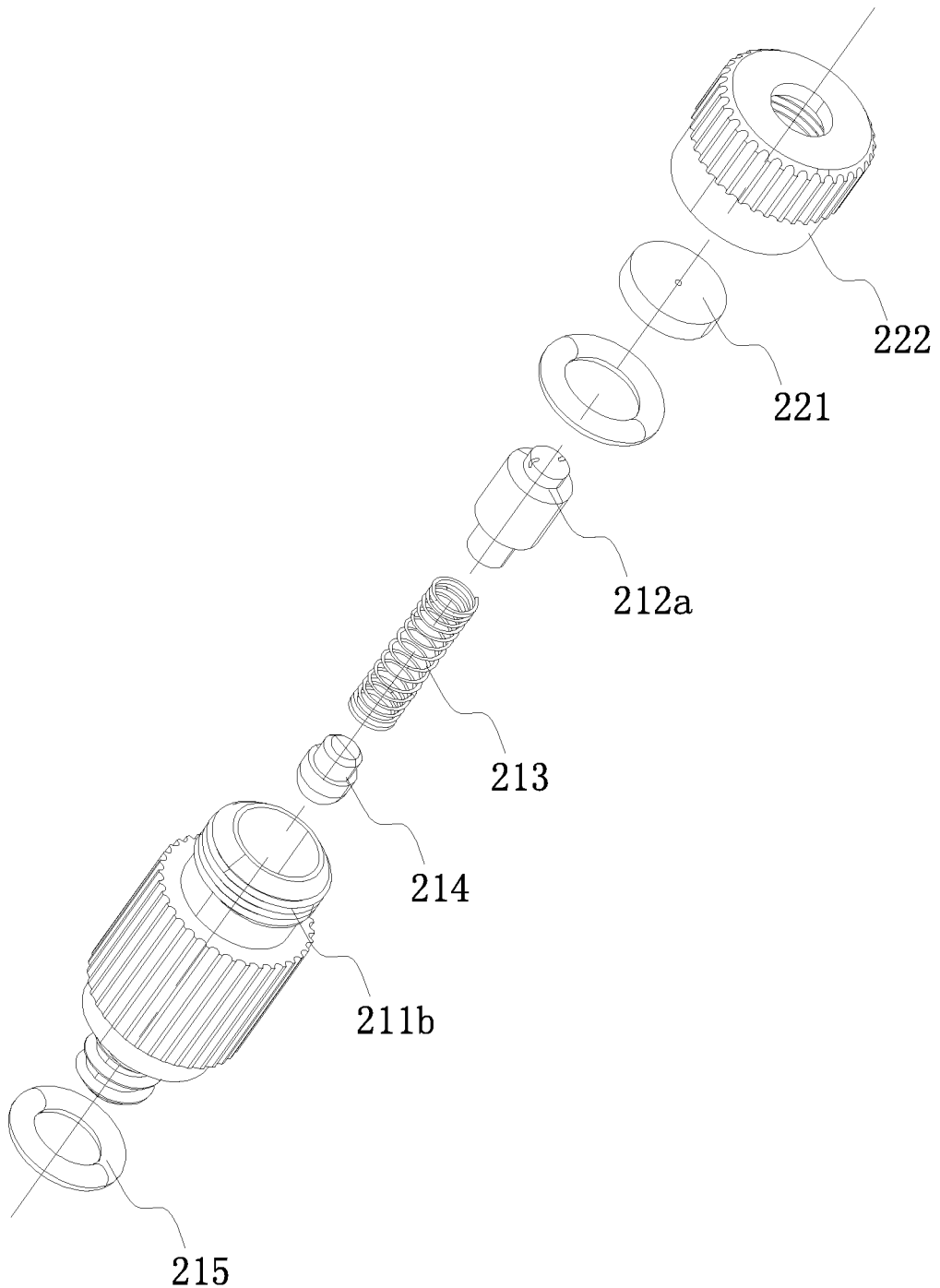
FIG. 18 is an exploded view of the nozzle of FIG. 14.
Figure 19:
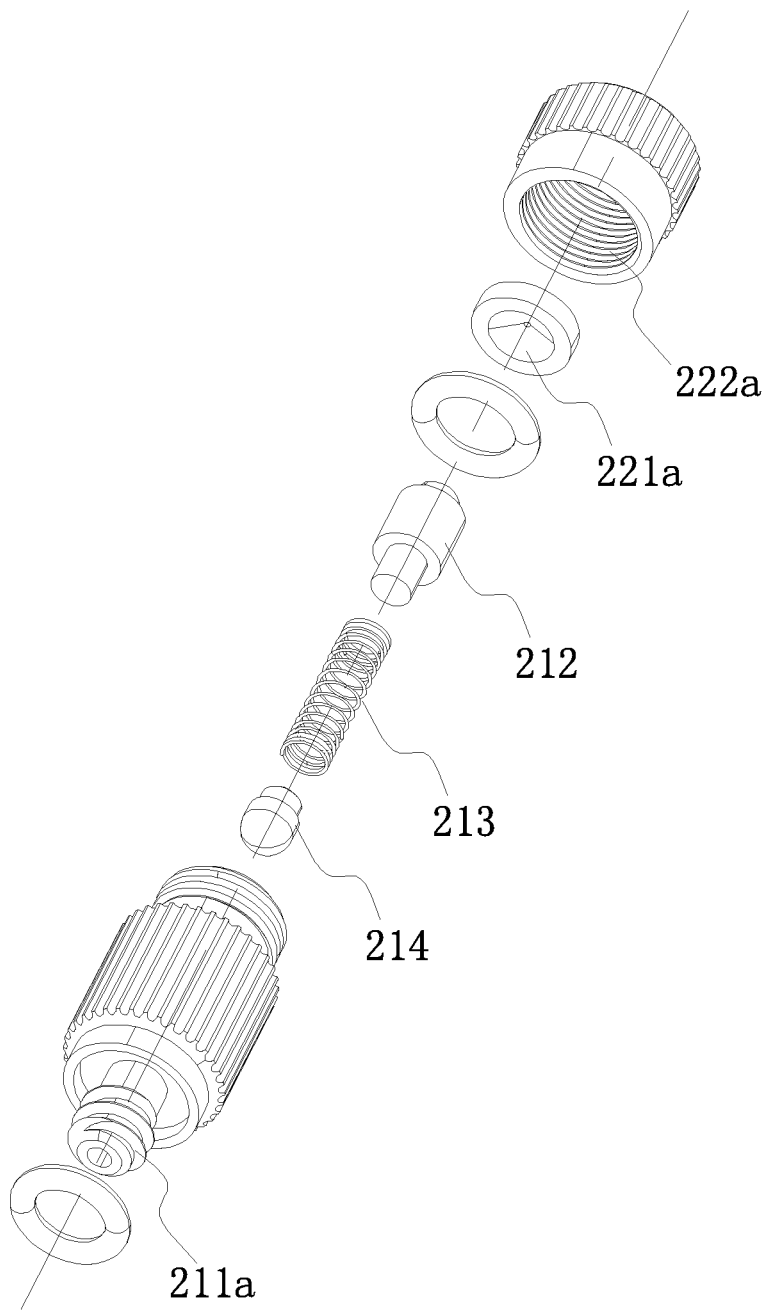
FIG. 19 is another exploded view of the nozzle of FIG. 14.

As shown in FIGS. 13 and 14, in this example, the nozzle 20 includes a nozzle body 21 and a nozzle head 22. The nozzle body 21 is configured to install the nozzle 20 to the support assembly 202 or the fan assembly 201. The nozzle head 22 is installed to the nozzle body 21 and the nozzle head 22 sprays water into the environment in a form of water mist.

As shown in FIGS. 14 to 19, in this example, the nozzle body 21 includes a support piece 211 and a first part 212. The support piece 211 supports the first part 212, the support piece 211 is formed with a first threaded portion 211a, and the main machine is formed with a fitting portion fitting with the first threaded portion 211a so that the support piece 211 may be detachably installed to the main machine through the first threaded portion 211a.

The nozzle head 22 includes a second part 221 and a connection piece 222, where the connection piece 222 is configured to support the second part 221. In this example, the second part 221 is detachably installed to the nozzle body 21. Specifically, the support piece 211 is formed with a second threaded portion 211b, the connection piece 222 is formed with a second fitting portion 222a, and the whole formed by the connection piece 222 and the second part 221 is detachably installed to the support piece 211 of the nozzle body 21 through the second fitting portion 222a.

The first part 212 is formed with a first surface 212a, and the second part 221 is formed with a second surface 221a. When the second part 221 is installed to the nozzle body 21 through the connection piece 222, a water flow channel 223 through which water flows is formed between the second surface 221a and the first surface 212a. That is, the water flow channel 223 is disposed between the first surface 212a and the second surface 221a and sandwiched between the first surface 212a and the second surface 221a. Of course, it is to be understood that the water flow channel 223 here may be a part of a channel in the nozzle 20 for water to flow through. A dimension of the water flow channel 223 may be less than dimensions of other parts of the channel, and of course, it is not limited to this.

In this example, the second part 221 can be detached from the nozzle body 21. When the second part 221 is detached from the nozzle body 21, the second surface 221a is at least partially exposed to be cleaned. The dimension of the water flow channel 223 in the nozzle 20 is relatively small. After a long time of operation, scale, impurities, debris, and the like are likely to clog the water flow channel 223, which seriously affects the volume of water sprayed from the nozzle 20 and even causes the nozzle 20 to be unable to spray the water. In this example, the second part 221 can be detached from the nozzle body 21, and when the second part 221 is detached, the first surface 212a is exposed so that the user can conveniently clean the first surface 212a of the first part 212 and can also take out the debris trapped in the water flow channel 223, thereby not affecting the use of the nozzle 20. On one hand, the use cost can be significantly reduced, and the nozzle 20 is prevented from being clogged so that the operation of the misting fan 200 is not affected, thereby improving the operation efficiency of the misting fan 200. In addition, the nozzle body 21 can be cleaned only by detaching the nozzle head 22, which is convenient and quick to operate.

In this example, when the nozzle head 22 is detached from the nozzle body 21, the second surface 221a is also at least partially exposed so that the user can also clean the second surface 221a on the nozzle head 22.

Specifically, a water inlet hole 211c is formed at an end of the support piece 211, an accommodation cavity 211d is formed in the support piece 211, the first part 212 is disposed in the accommodation cavity 211d, and the first part 212 is movably disposed in the accommodation cavity 211d. Of course, in other implementations, the first part 212 may also be fixedly disposed in the accommodation cavity 211d. The first surface 212a surrounds a centerline 200a, the second surface 221a also surrounds the centerline 200a, and the second surface 221a is disposed on an outer side of the first surface 212a. In a plane perpendicular to the centerline 200a, a cross-section of the water flow channel 223 between the first surface 212a and the second surface 221a is annular.

The second part 221 is formed with a water outlet hole 221b configured to spray the water into an external environment. The water outlet hole 221b is centered on the centerline 200a and disposed at an end of the second surface 221a. The second part 221 and the connection piece 222 are detachably connected so that the second part 221 can be replaced separately. A diameter of the water outlet hole 221b is greater than or equal to 0.2 mm and less than or equal to 0.4 mm.

The nozzle body 21 further includes a spring 213 and an elastic piece 214. The spring 213 is supported between the elastic piece 214 and the first part 212. A hole 211e is formed on a bottom surface of the accommodation cavity 211d. The hole 211e communicates with the water inlet hole 211c. The elastic piece 214 is supported at the hole 211e. When the misting fan 200 stops operating, the elastic piece 214 can effectively prevent water in a waterway system from flowing out through the nozzle 20, thereby preventing the nozzle 20 from dripping water. The spring 213 presses the first part 212 toward the second part 221 so that it can be ensured that the dimension of the water flow channel 223 is small enough, which is conducive to the formation of water mist.

The first surface 212a is at least partially an inclined surface, and the second surface 221a is also at least partially an inclined surface. A section line of the first surface 212a in a plane passing through the centerline 200a obliquely intersects with the centerline 200a, and a section line of the second surface 221a in the plane also obliquely intersects with the centerline 200a. Alternatively, it is to be understood that the first surface 212a is a part of one conical surface, and the second surface 221a is a part of another conical surface.

A first sealing ring 215 is connected to the nozzle body 21 and prevents water from flowing out of an outer wall of the nozzle 20 when the nozzle 20 is installed to the main machine.

Figure 20:
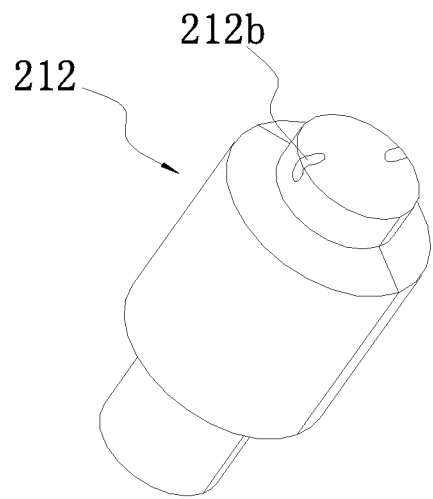
FIG. 20 is an enlarged view of a first part of FIG. 18.
Figure 21:
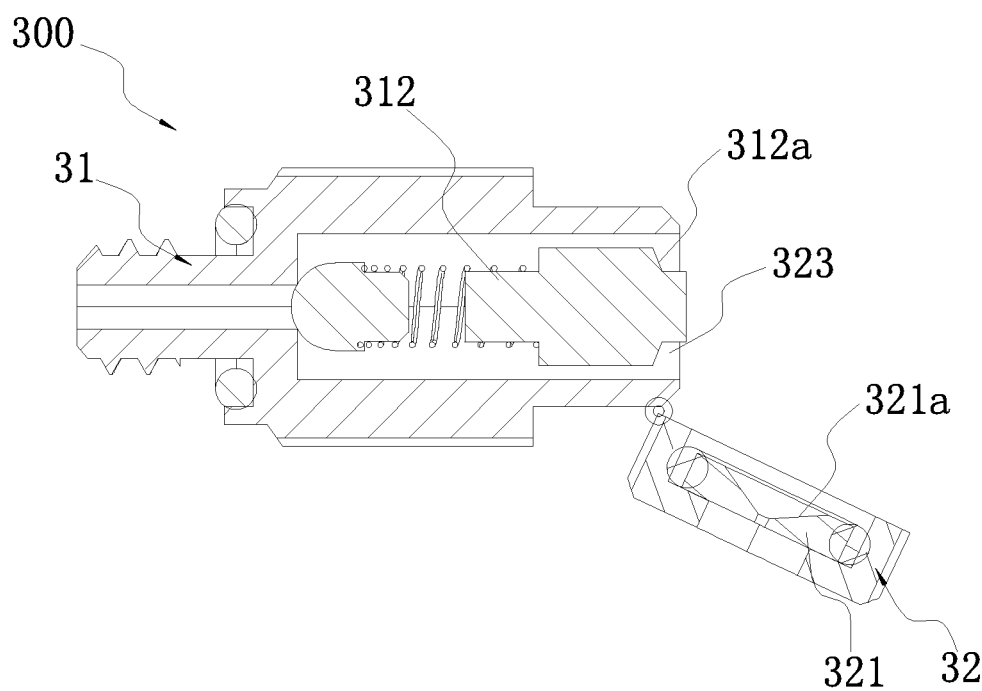
FIG. 21 is a sectional view of a nozzle according to example three.

In this example, as shown in FIG. 20, a notch 212b is formed at an end of the first part 212, and the notch 212b allows water to flow through to the water outlet hole 221b after the water flows through the water flow channel 223. In this manner, even if the first part 212 abuts against the second part 221 through the spring 213, the water can sequentially flow through the water flow channel 223, the notch 212b, and the water outlet hole 221b.

An example nozzle 300 is shown in FIG. 2. Nozzle 300 is applicable to the misting fan 100 in FIG. 1. The nozzle 300 has basically the same structure as the nozzle 20 in example two, except that a nozzle head 32 and a nozzle body 31 are movably connected. Hereinafter, only the structural differences between the nozzle 300 in this example and the nozzle 20 are described.

In this example, the nozzle head 32 and the nozzle body 31 are rotatably connected. It is to be understood that in other examples, the nozzle head and the nozzle body may be slidably connected. In this manner, a second part 321 is movably installed to the nozzle body 31. When the second part 321 moves to a first position relative to a first part 312 in the nozzle body 31, a water flow channel 323 is formed between a second surface 321a and a first surface 312a. When the second part 321 moves to a second position relative to the first part 312, the first surface 312a is at least partially exposed to be cleaned. The movement of the second part 321 relative to the first part 312 may be understood as that the second part 321 can move relative to the first part 312 and may also be understood as that the second part 321 can rotate relative to the first part 312. In this manner, when the nozzle 300 is clogged, the user only needs to rotate the nozzle head 32 or move the nozzle head 32 to clean the water flow channel 323, which further improves the convenience of operation.

Figure 22:
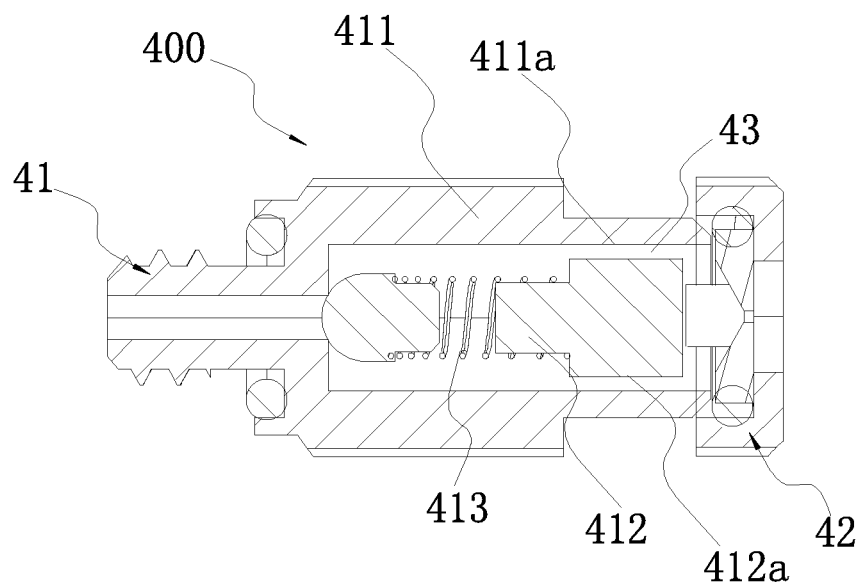
FIG. 22 is a sectional view of a nozzle according to example four, where a nozzle head is at a closed position.
Figure 23:
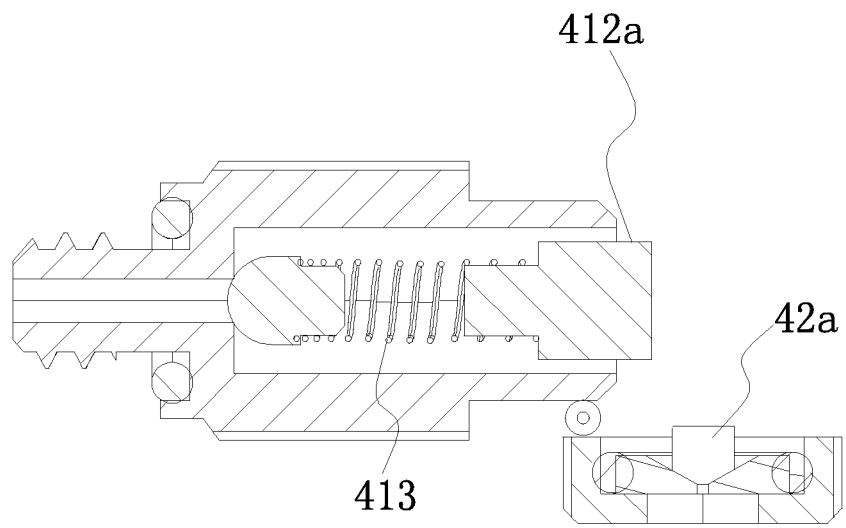
FIG. 23 is a sectional view of the nozzle of FIG. 22 when the nozzle head is at an open position.

A nozzle 400 is shown in FIGS. 22 and 23. Nozzle 400 is applicable to the misting fan 100 in FIG. 1. The nozzle 400 includes a nozzle body 41 and a nozzle head 42. In this example, the nozzle body 41 includes a first part 411, a second part 412, and a spring 413. The first part 411 is formed with a first surface 411a, and the second part 412 is formed with a second surface 412a. A water flow channel 43 through which water flows may be formed between the first surface 411a and the second surface 412a. The nozzle head 42 is formed with a pressing portion 42a which can drive the second part 412 to move relative to the first part 411. The nozzle head 42 can move relative to the nozzle body 41 to an open position and a closed position. When the nozzle head 42 is at the closed position, the pressing portion 42a presses the second part 412 to move to a first position relative to the first part 411. At this time, the water flow channel 43 is formed between the first surface 411a and the second surface 412a. When the nozzle head 42 is at the open position, the pressing portion 42a is detached from the second part 412, and the second part 412 can move to a second position under the action of the spring 413. At this time, the second surface 412a is at least partially exposed to be cleaned. It is to be understood that in other implementations, the first surface 411a may also be at least partially exposed to be cleaned.

The above illustrates and describes basic principles, main features, and advantages of the present disclosure. It is to be understood by those skilled in the art that the preceding examples do not limit the present disclosure in any form, and technical solutions obtained by means of equivalent substitution or equivalent transformation fall within the scope of the appended claims.

What is claimed is:

1. A misting fan, comprising:
   a nozzle configured to spray water;
   a fan assembly comprising fan blades and an electric motor configured to drive the fan blades to rotate; and
   a support assembly configured to support the fan assembly;
   wherein the support assembly is formed with a coupling portion for detachably coupling a battery pack and the nozzle is disposed on the fan assembly or the support assembly,
   wherein the nozzle comprises a nozzle body comprising a first part formed with a first surface and a second part detachably installed to the nozzle body and formed with a second surface, a water flow channel is formed between the second surface and the first surface when the second part is installed to the nozzle body, and the first surface is at least partially exposed to be cleaned when the second part is detached from the nozzle body, and
   wherein the nozzle body further comprises a support piece configured to support the first part and the first part and the support piece are detachably connected.

2. The misting fan of claim 1, wherein the nozzle is detachably installed to the support assembly.

3. The misting fan of claim 1, wherein the fan assembly further comprises a fan cover surrounding the fan blades and the nozzle is detachably installed to the fan cover.

4. The misting fan of claim 1, wherein when the second part is detached from the nozzle body and the second surface is at least partially exposed for cleaning access.

5. The misting fan of claim 1, wherein the nozzle body further comprises a connection piece configured to detachably connect the second part to the nozzle body, the second part is formed with a water outlet hole through which the water is sprayed to an outside, and the second part and the connection piece are detachably connected.

6. The misting fan of claim 1, wherein the second part is formed with a water outlet hole through which the water is sprayed to an outside and a diameter of the water outlet hole is greater than or equal to 0.2 mm and less than or equal to 0.4 mm.

7. The misting fan of claim 1, wherein the second part is formed with a water outlet hole through which the water is sprayed to an outside, the water outlet hole has a centerline, the first surface surrounds the centerline, and the second surface surrounds the centerline.

8. The misting fan of claim 1, wherein the nozzle body further comprises a support piece configured to support the first part and the support piece is formed with a water inlet hole and an accommodation cavity in which the first part is disposed.

9. The misting fan of claim 8, wherein the first part is movably disposed in the accommodation cavity.

10. The misting fan of claim 9, wherein the nozzle body further comprises an elastic piece disposed in the accommodation cavity and a spring supported between the elastic piece and the first part, the accommodation cavity is formed with a hole communicating with the water inlet hole on a bottom surface of the accommodation cavity, and the elastic piece is supported at the hole.

11. The misting fan of claim 1, wherein the nozzle has a water outlet hole centered on a centerline, a section line of the first surface in a plane passing through the centerline obliquely intersects with the centerline, and a section line of the second surface in the plane also obliquely intersects with the centerline.

12. The misting fan of claim 1, wherein the first surface is a part of one conical surface and the second surface is a part of another conical surface.

13. The misting fan of claim 1, wherein the nozzle body further comprises a support piece configured to support the first part, the support piece is formed with a threaded portion configured to detachably install the nozzle to the fan assembly or the support assembly, and a sealing ring is disposed on the support piece.

14. The misting fan of claim 1, wherein the battery pack is detachably installed to the coupling portion, the misting fan further comprises a waterway system comprising a water pipe connected to the nozzle and a pump connected to the water pipe, and an output water pressure of the pump is greater than or equal to 40 psi and less than or equal to 120 psi.

15. A misting fan, comprising:
   a nozzle configured to spray water;
   a fan assembly comprising fan blades and an electric motor configured to drive the fan blades to rotate; and
   a support assembly configured to support the fan assembly;
   wherein the support assembly is formed with a coupling portion for detachably coupling a battery pack and the nozzle is disposed on the fan assembly or the support assembly; and
   wherein the nozzle comprises a nozzle body comprising a first part formed with a first surface and a second part movably installed to the nozzle body and formed with a second surface, a water flow channel is formed between the second surface and the first surface when the second part moves to a first position relative to the first part, and the first surface is at least partially exposed to be cleaned when the second part moves to a second position relative to the first part, and wherein the nozzle body further comprises a support piece configured to support the first part and the first part and the support piece are detachably connected.

16. A misting fan, comprising:

a nozzle configured to spray water;

a fan assembly comprising fan blades and an electric motor configured to drive the fan blades to rotate; and a support assembly configured to support the fan assembly;

wherein the support assembly is formed with a coupling portion for detachably coupling a battery pack and the nozzle is disposed on the fan assembly or the support assembly; and wherein the nozzle comprises a nozzle body having a first part formed with a first surface and a second part movable relative to the first part and formed with a second surface, a water flow channel is formed between the second surface and the first surface when the second part moves to a first position relative to the first part, and the first surface or the second surface is at least partially exposed to be cleaned when the second part moves to a second position relative to the first part, and wherein the nozzle body further comprises a support piece configured to support the first part and the first part and the support piece are detachably connected.

17. The misting fan of claim 16, wherein the second part is formed with a water outlet hole through which the water is sprayed to an outside and a diameter of the water outlet hole is greater than or equal to 0.2 mm and less than or equal to 0.4 mm.

18. The misting fan of claim 17, wherein the second part is formed with the water outlet hole through which the water is sprayed to the outside, the water outlet hole has a centerline, the first surface surrounds the centerline, and the second surface surrounds the centerline.

19. The misting fan of claim 18, wherein the first surface is a part of one conical surface and the second surface is a part of another conical surface.

* * * * *